(12) United States Patent
Asaoka et al.

(10) Patent No.: US 6,649,234 B1
(45) Date of Patent: *Nov. 18, 2003

(54) FINE POWDER MATERIAL FOR FORMING IN-RECEIVING LAYER, MANUFACTURING METHOD THEREOF, RECORDING MEDIUM MAKING USE OF THE FINE POWDER MATERIAL AND IMAGE FORMING METHOD USING THE RECORDING MEDIUM

(75) Inventors: Masanobu Asaoka, Yokohama (JP); Akemi Ishizaki, Yokohama (JP); Nobuyuki Hosoi, Kazo (JP); Katsutoshi Misuda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,115

(22) Filed: Feb. 3, 1999

(30) Foreign Application Priority Data

Feb. 6, 1998 (JP) .............................. 10-039842

(51) Int. Cl.⁷ .............................................. B41M 5/00
(52) U.S. Cl. .............................. 428/32.32; 428/32.34; 428/32.37
(58) Field of Search ................ 428/328, 329, 428/195, 32.32, 32.34, 32.37

(56) References Cited

U.S. PATENT DOCUMENTS

| 4,202,870 A | 5/1980 | Weber et al. ............... 423/630 |
| 4,242,271 A | 12/1980 | Weber et al. ......... 260/448 AD |
| 4,879,166 A | 11/1989 | Misuda et al. ............... 428/212 |
| 4,969,990 A | 11/1990 | Simpson ................ 208/216 PP |
| 5,104,730 A | 4/1992 | Misuda et al. ........... 428/304.4 |

FOREIGN PATENT DOCUMENTS

| EP | 0 622 244 A1 | 11/1994 |
| EP | 0 749 845 A2 | 12/1996 |
| JP | 52-53012 | 4/1977 |
| JP | 53-49113 | 5/1978 |
| JP | 55-5830 | 1/1980 |
| JP | 55-51583 | 4/1980 |
| JP | 55-146786 | 11/1980 |
| JP | 57-44605 | 9/1982 |
| JP | 2-276670 | 11/1990 |
| JP | 4-37576 | 2/1992 |
| JP | 5-32037 | 2/1993 |

OTHER PUBLICATIONS

J, Roček, et al., "Porous Structure of Aluminium Hydroxide and its Content of Pseudoboehmite", Applied Catalysis, vol. 74, (1991) pp. 29–36.

J. Roček, et al., "Effect of Precipitation and Aging on Porous Structure of Aluminium Hydroxide. I. Statistical Treatment of Experimental Data", Collect. Czech. Chem. Commun., vol. 56, (1991) pp. 1253–1262.

*Primary Examiner*—Pamela R. Schwartz
(74) *Attorney, Agent, or Firm*—Fitzpatrick, Cella, Harper & Scinto (57) ABSTRACT

Provided is a fine powder material for forming an ink-receiving layer on a recording medium, wherein a pore radius maximum exists within a range of from 90 to 120 Å in a pore radius distribution of said fine powder material and wherein a total volume of pores having radii not exceeding 50 Å is not more than 6.0% of a volume of all pores.

4 Claims, 6 Drawing Sheets

FINE POWDER MATERIAL FOR FORMING IN-RECEIVING LAYER, MANUFACTURING METHOD THEREOF, RECORDING MEDIUM MAKING USE OF THE FINE POWDER MATERIAL AND IMAGE FORMING METHOD USING THE RECORDING MEDIUM

BACKGROUND OF THE INVENTION

1. Field of the Invention

The present invention relates to a fine powder material for forming an ink-receiving layer, a manufacturing method of the fine powder material, a recording medium making use of the fine powder material and an image forming method using the recording medium.

The ink-jet recording method is a method in which minute droplets of ink are ejected to recording media such as paper by various principles and adhered thereon to record images, characters and the like. Since this method features merits to allow various patterns to be recorded at high speeds, with low noise, in multiple colors and without development, the method is rapidly prevailing not only to printers but also to information apparatus such as copying machines, word processors, facsimile machines and plotters. Furthermore, in the recent years where high performance digital cameras, digital video scopes and scanners have been offered at low prices and personal computers have been widely prevailing, there have been increasing occasions to record image data obtained from these appliances by the ink-jet recording method.

Accordingly, there has been demanded ink-jet recording methods which are capable of providing images which are not inferior as compared with those of silver salt type photographs and plate-making type multi-color prints.

While recording apparatus and recording methods have been improved in recording images speedily and making high precise and multi-color images, there have been demanded upgraded characteristics of recording media.

2. Related Background Art

There have conventionally been proposed various recording media as those for the ink-jet recording. For example, Japanese Patent Application Laid-Open No. 52-53012 discloses a paper for ink-jet recording which is infiltrated with a facing paint into a lower-sized base paper. Japanese Patent Application Laid-Open No. 53-49113 discloses a paper for ink-jet recording which is impregnated with a water-soluble polymer into a sheet comprising urea-formalin resin powder. Japanese Patent Application Laid-Open No. 55-5830 discloses a paper for ink-jet recording which is provided with an ink absorptive layer on a surface of a substrate, Japanese Patent Application Laid-Open No. 55-51583 discloses an example that an amorphous silica is used as a pigment in a covering layer and Japanese Patent Application Laid-Open No. 55-146786 discloses an example in which a coated layer of a water-soluble polymer is used.

Alumina hydrate has recently been attracting attention as a material for composing a portion of a recording medium where an ink is received. This is because the alumina hydrate has positive electric charges and retains ink well, thereby being capable of providing images having a high coloristic performance and a high glossiness which are unavailable with conventional recording media. U.S. Pat. Nos. 4,879,166 and 5,104,730 and Japanese Patent Application Laid-Open Nos. 2-276670, 4-37576 and 5-32037 disclose recording media which use layers containing alumina hydrate of pseudo-boehmite structures as ink-receiving layers.

However, the recording media which use alumina hydrate as a material for the ink-receiving layers may pose problems enumerated below in certain cases of attempts made to record, in a far shorter time, highly precise images which are not inferior as compared with those obtained on silver salt type photographs and plate-making type multi-color prints.

(1) Since inks are supplied to the recording media in larger amounts per unit time for recording highly precise color images in a shorter time, printed ink cannot be absorbed completely by pores and flows over surfaces of the ink-receiving layers, whereby bleeding occurs to deteriorate qualities of prints.

(2) Beading occurs when ink absorbing speeds cannot sufficiently cope with high recording speeds though the recording media must have high ink absorbing speeds for recording at high speeds.

"Beading" is a phenomenon that a preceding ink dot comes into contact with the next ink dot before being absorbed and fixed by a recording medium, whereby adjacent printed dots are connected to each other like beads and make an optical density of image uneven.

These problems are associated with each other and an absorbing speed is naturally tends to be higher as a recording medium has a larger ink absorbing capacity. However, certain recording media which have large ink absorbing capacities have slow ink absorbing speeds. Such a recording medium allows inks to be kept in conditions flowing over the recording medium before it completely absorbs the inks, when large amount of ink is applied. Accordingly, inks of adjacent dots are mixed with each other, thereby causing bleed in printed characters and color mixing in multi-color printing. As a result, the recording medium remarkably degrades qualities of prints and images.

Furthermore, relationship between ink absorptivity and color density must be taken into consideration in addition to the problems mentioned above.

The relationship is associated with a pore volume and its distribution of alumina hydrate. In order to enhance an ink absorptivity, it is usually sufficient to enlarge a pore volume. In other words, it is sufficient to shift a pore radius distribution toward a larger side. When a pore radius distribution (a pore radius maximum in particular) is shifted excessively toward a larger side, however, an image formed by the ink-jet method is made whitish as a whole due to irregular reflection or the like occurring in pores, thereby tending to hinder coloring property of dye and lower a color density.

As a measure to prevent such an adverse phenomenon, Japanese Patent Publication No. 57-44605 proposes a method to narrow a range of pore radius distribution by repeating a plurality of treatments and shift the pore radius distribution toward a larger side. When treatments are conducted to narrow a pore radius distribution, the distribution is usually shifted toward a higher pore radius maximum. However, such a method increases treating steps and allows a production amount of recording medium to be limited by a capacity of a reaction vessel which is installed first for batch system treatments. Accordingly, the method tends to enhance a manufacturing cost of the recording medium.

In contrast, a continuous method which is capable of producing a recording medium in a large amount, thereby making it possible to manufacture it at a low cost. However, alumina produced by such a continuous method has a wide pore radius distribution as a physical property thereof. This is because starting materials are put as occasion demands for production by the continuous method, portions at an advanced reaction stages are mixed with portions at initial reaction stages and crystals are grown unevenly, thereby widening a pore radius distribution. Accordingly, the alumina contains a large amount of components which have small pore radii within the large pore radius distribution and hinders absorption of inks, thereby having an unsatisfactory ink absorptivity. Furthermore, the alumina has an unsatisfactory color density since it has a pore radius distribution which covers large pore radii.

SUMMARY OF THE INVENTION

A primary object of the present invention is to provide a fine powder material which has an enhanced ink absorption speed while maintaining a favorable dye fixing property, excellent color density, high coloring property and high glossiness, allows printed dot to be formed with a high reproductivity and can be manufactured at a low cost, a manufacturing method of this fine powder material and a recording medium using the fine powder material. Another object of the present invention is to provide an image forming method by ink-jet recording using the recording medium.

According to the present invention there is provided a fine powder material for forming an ink-receiving layer of a recording medium, in which a pore radius maximum exists within a range of from 90 to 120 Å in a pore radius distribution of the fine powder material and a total volume of pores having radii not exceeding 50 Å is not more than 6.0% of a volume of all pores.

According to the present invention there is also provided a manufacturing method of fine power material in which a fine powder material having a pore radius maximum $N_1$ in a pore radius distribution is secondarily treated to make a fine powder material having a pore radius maximum $N_2$ in a pore radius distribution so as to satisfy an equation $$N_1 \cong N_2 \text{ or } N_2 < N_1$$

and a total volume of pores having radii not exceeding 50 Å is not more than 6.0% of a volume of all pores after the secondary treatment.

According to the present invention there is further provided a recording medium provided with an ink-receiving layer comprising a fine powder material and a binder formed on a base material, wherein a pore radius maximum exists within a range of from 90 to 120 Å in a pore radius distribution of the ink-receiving layer and a total volume of pores having radii not exceeding 50 Å is not more than 10.0% of a volume of all pores.

According to the present invention there is still provided a recording medium provided with an ink-receiving layer comprising a fine powder material and a binder formed on a base material, wherein a pore radius maximum exists within a range of from 90 to 120 Å in a pore radius distribution of the fine powder material and a total volume of pores having radii not exceeding 50 Å is not more than 6.0% of a volume of all pores of the fine powder material, and wherein a pore radius maximum exists within a range of from 90 to 120 Å in a pore radius distribution of the ink-receiving layer and a total volume of the pores having the radii not exceeding 50 Å is not more than 10.0% of a volume of all pores on the ink-receiving layer.

The image forming method according to the present invention is a method in which recording is performed on the recording medium described above by an ink-jet recording method.

DETAILED DESCRIPTION OF THE INVENTION

The recording medium according to the present invention has an ink-receiving layer formed on a substrate. The ink-receiving layer is a porous layer which is made of a fine powder material of alumina hydrate, and functions to absorb and maintain an ink. A volume of pores which have small radii not exceeding 50 Å is extremely small in a pore radius distribution of the fine alumina hydrate powder material of the recording medium according to the present invention. In other words, pores which have small radii do not substantially exist in the fine alumina hydrate powder material. In the pore radius distribution of the fine alumina hydrate powder material, a total volume of the pores which have radii not exceeding 50 Å is not more than 6.0% to a volume of all pores. This means that the total volume of the pores having radii not exceeding 50 Å corresponds to 0.05 cc/g or lower.

It is generally known that when a solution which contains particles having a certain particle size distribution is dried for hardening to form a layer, a ratio of small particles tends to be high in portions which are to form a surface of a layer in a process where the solution changes from a liquid state into a solid state. A phenomenon tends to occur that the small particles penetrate among large particles and agglomerate one another in the vicinities of the surface, thereby making a pore size small in the vicinities of the surface. When such the phenomenon occurs in formation of an ink-receiving layer using an alumina hydrate, it lowers an ink absorptivity, thereby constituting a cause for slowdown of an absorbing speed.

Figure 4:
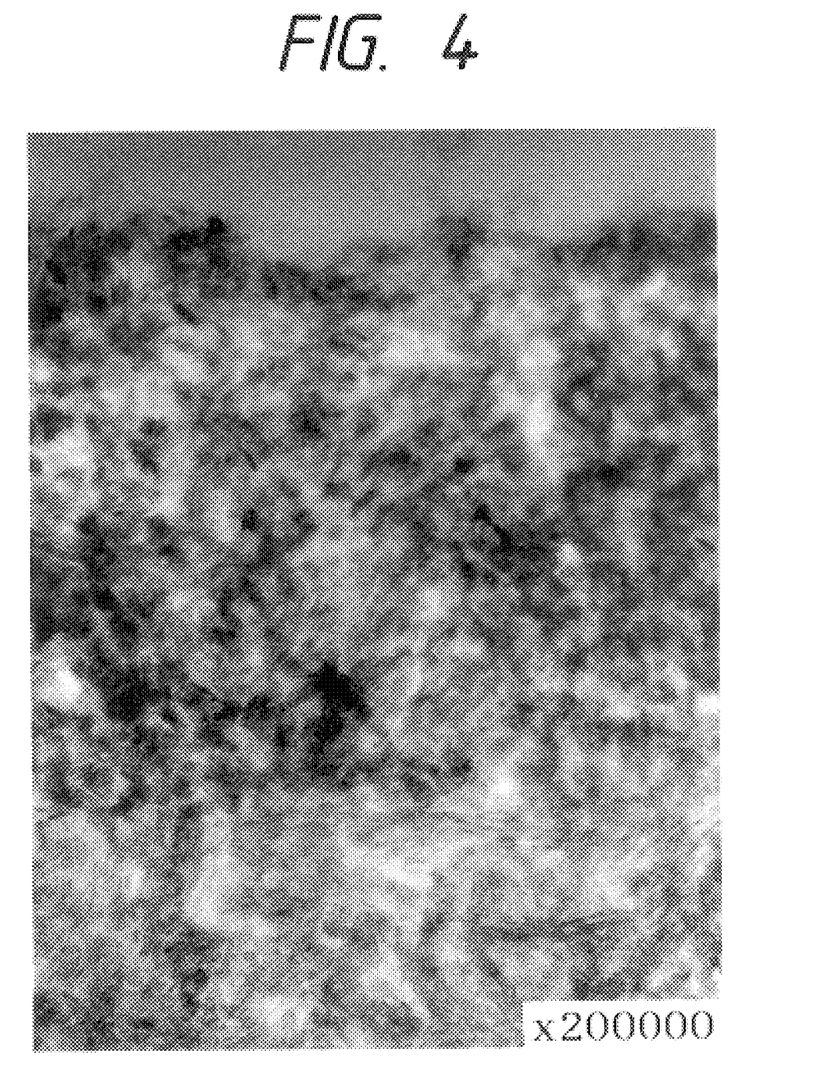
FIG. 4 is a transmission electron microphotograph of a section of a recording medium of Comparative Example 1 taken in a direction perpendicular to a substrate.
Figure 5:
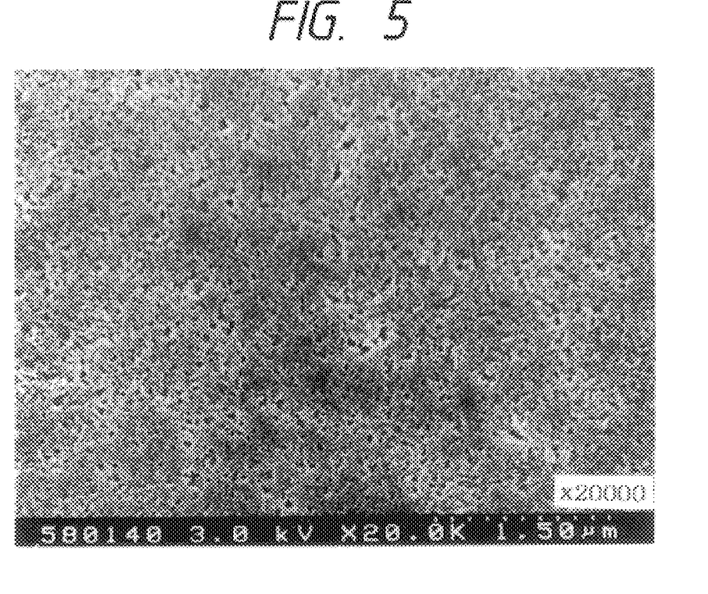
FIG. 5 is a scanning electron microphotograph of the surface of the ink-receiving layer of the recording medium of Comparative Example 1.
Figure 6:
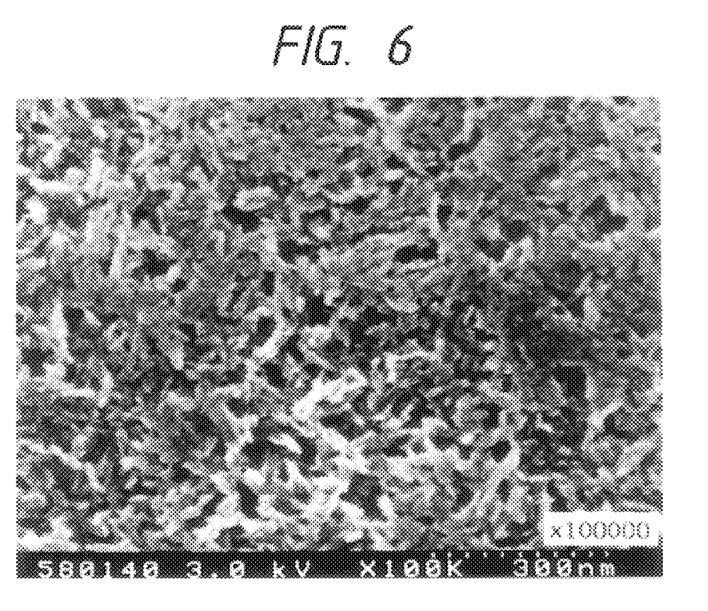
FIG. 6 is a scanning electron microphotograph of the surface of the ink-receiving layer of the recording medium of Comparative Example 1.

FIG. 4 is a transmission electron microphotograph (at a magnification of 200,000) of a section of a layer in a direction perpendicular to a substrate which is obtained by applying to a base a mixture of an alumina hydrate having a broad particle size distribution, a binder and pure water and drying it, whereas FIGS. 5 and 6 are scanning electron microphotographs of a surface of the layer having the broad particle size distribution (FIG. 5 at a magnification of 20,000 and FIG. 6 at a magnification of 100,000). From FIG. 5, it will be understood that layers of small components are distributed on the surface of this layer (see portions which seem to be dense on the surface side). Furthermore, a large number of portions consisting of agglomerated small particles exist on the surface of the recording medium as seen from FIGS. 5 and 6. These portions have structures wherein gaps are formed in an extremely small number.

In contrast, the alumina hydrate used in the recording medium according to the present invention contains a small number of pores having small radii, thereby having a favorable ink absorptivity. In the recording medium according to the present invention an ink-receiving layer is formed using alumina hydrate in which a total volume of pores having radii not exceeding 50 Å in a pore radius distribution is not more than 6.0% of a volume of all pores. In other words, the recording medium according to the present invention is characterized in that it has an extremely small number of pores having small radii. This means that small particles are distributed little on a surface of the recording medium, whereby small pores are distributed little on the surface of the recording medium. Accordingly, absorption of an ink is not hindered by small pores distributed on the surface of the recording medium, thereby making it possible to obtain a recording medium having a high ink absorbing speed. This recording medium is capable of providing a high quality print free from degradation due to mixture of colors and the like.

Figure 1:
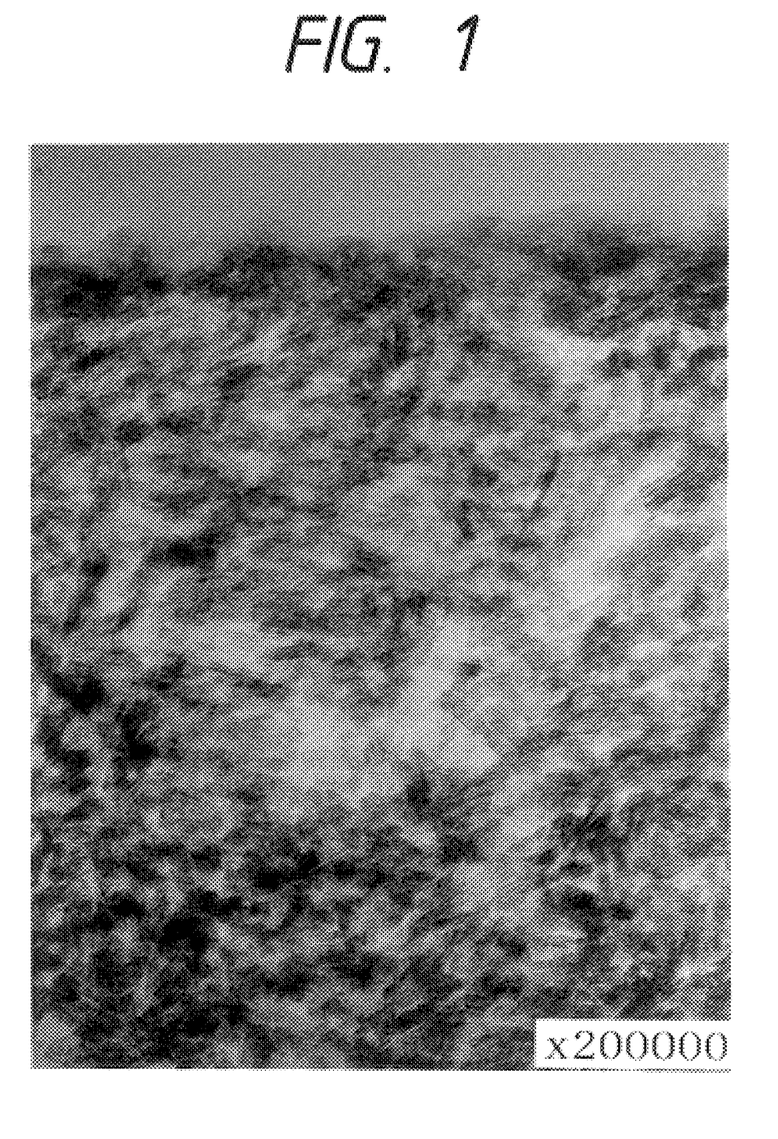
FIG. 1 is a transmission electron microphotograph of a section of the recording medium according to the present invention which is taken in a direction perpendicular to a substrate.

When a layer is formed similarly on a substrate using the alumina hydrate according to the present invention, a layer consisting of small components is scarcely formed on a surface of a recording medium as shown in the transmission electron microphotograph provided in FIG. 1 (magnification at 200,000). Furthermore, small particles are scarcely recognized on the surface of the recording medium and gaps are formed so as to have a uniform size on the surface of the recording medium as seen from the scanning electron microphotographs presented in FIGS. 2 and 3 (FIG. 2 at a magnification of 20,000 and FIG. 3 at a magnification of 100,000).

Usable as an alumina hydrate for the recording medium according to the present invention is those which are capable of forming ink-receiving layers having the required recording characteristics or preferably those which are expressed by a general formula: $Al_2O_{3-n}(OH)_{2n} \cdot mH_2O$.

In the general formula mentioned above, n represents an integer of 0, 1, 2 or 3, and m designates a value of 0 to 10, preferably a value of 0 to 5. However, m and n do not have a value of 0 at the same time. Since $mH_2O$ represents a desorptible aqueous phase which does not serve for formation of a crystal lattice of $mH_2O$ in most cases, m can have a value which is an integer or not an integer. Furthermore, a value of m may reach 0 when such a material is heated.

An alumina hydrate can be manufactured by hydrolyzing aluminum alkoxide or sodium aluminate as disclosed by U.S. Pat. Nos. 4,242,271 or 4,202,870 or by a known method such as that disclosed by Japanese Patent Publication No. 57-44605 or the like which neutralizes an aqueous solution of sodium aluminate by adding an aqueous solution of aluminum sulfate or aluminum chloride. Rocek et al. (Collect Czech Chem Commun, Vol. 56, 1253 to 1262, 1991) has reported that a porous structure of an alumina hydrate is influenced by deposition temperature, pH level of solution, aging time and surface active agent. Furthermore, it is generally known that pseudo-boehmite, out of alumina hydrates, has a ciliary form or a different form as described in a literature (Rocek J., et al., Applied catalysis, Vol. 74, 29 to 36, 1991).

Furthermore, a BET specific surface area, a pore radius distribution and a pore volume of an alumina hydrate can be determined at the same time by the nitrogen adsorption-desorption method.

The alumina hydrate used for the recording medium according to the present invention is an alumina hydrate synthesized by the method mentioned above or a commercially available alumina hydrate from which components having small pore radii are eliminated by a secondary treatment. As commercially available industrial alumina hydrates, there can be mentioned, for example, AS-2 and AS-3, trade name, prepared by Shokubai Kagaku K. K. (Catalyst Chemical Industries, Ltd.) as well as #520, trade name, prepared by Nissan Kagaku K. K. (Nissan Chemical Ind. Co., Ltd.).

For the secondary treatment to eliminate small components, there is available the ultrafiltration method or the like to eliminate such components by filtration, or another method to grow small components by resynthesis after synthesizing an alumina hydrate. For example, an alumina hydrate to be used for the recording medium according to the present invention can be obtained, for example, by hydrolyzing aluminum alkoxide, or by hydrolyzing aluminum nitrate and sodium aluminate to prepare an alumina hydrogel slurry, forming powder of an alumina hydrate by the spray drying method or the like, dispersing the powder in an acidic solution and then eliminating small components by the ultrafiltration method or the like.

A method for the resynthesis will be described below.

First, an alumina hydrate is dispersed in an acidic solution. It is preferable that the solution is at a pH level of 3 to 4 at this step. Then, the pH level is adjusted to 10 with an alkaline reagent. Usable as the alkaline reagent is sodium aluminate, sodium hydroxide, potassium hydroxide or the like. When the solution is at a pH level lower than 10, a longer time is required for the next step. In contrast, too high a pH level will lower an effect. It is preferable to adjust a pH level to 10 to 11. Then, the solution is heated to 80° C. and stirred. It is preferable to continue the stirring for 4 to 20 hours though the stirring is variable dependently on starting substances. Too short a stirring time will provide an insufficient effect but too long a stirring time is unnecessary since the effect cannot be hardly enhanced by going on the stirring beyond a certain time. Then, a colloidal sol is prepared by adjusting a pH level to 8 with an acidic reagent. An alumina hydrate to be used for the recording medium according to the present invention can be obtained by desalting and deflocculating the colloidal sol.

When the small components are eliminated without subjected to a secondary treatment of the alumina hydrate, a total volume of pores having radii not exceeding 50 Å will usually exceed 12% of a volume of all pores.

Figure 8:
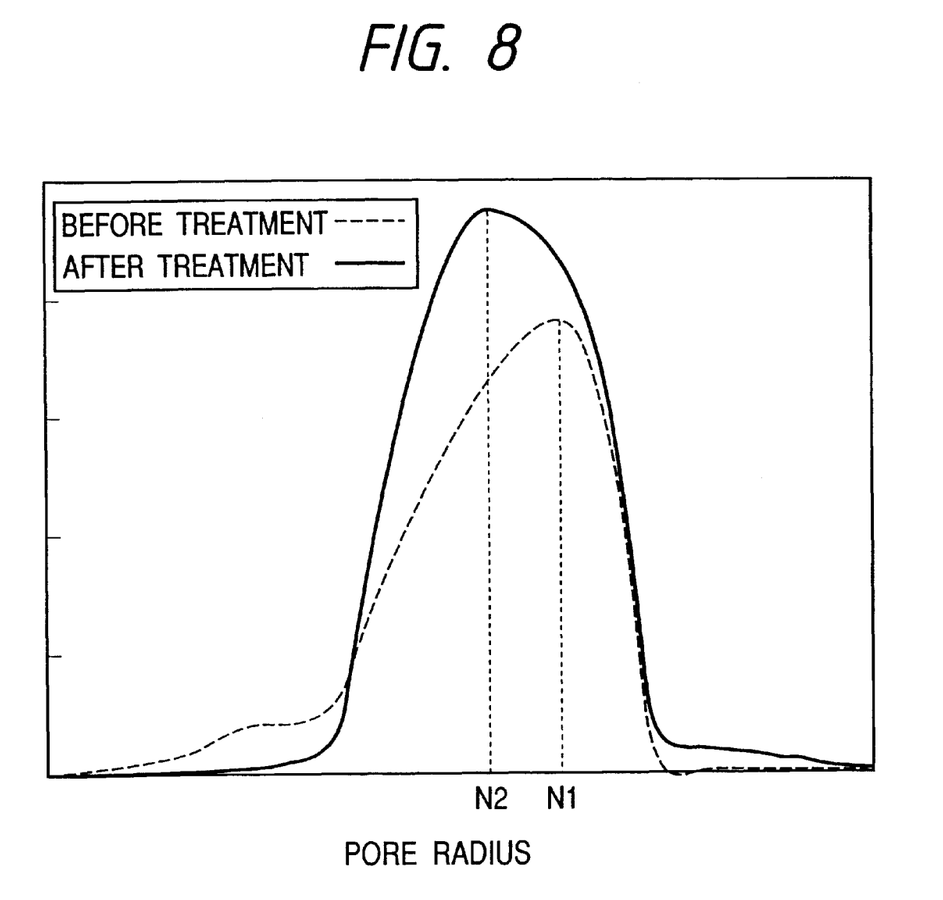
FIG. 8 is a diagram illustrating pore radius distributions before and after a secondary treatment of alumina hydrate.

According to the present invention, as shown in FIG. 8, a pore radius maximum after the treatment to eliminate the components ($N_2$) is substantially equal to ($N_1 \cong N_2$) or smaller than ($N_1 > N_2$) a pore radius maximum before the treatment ($N_1$). In the present invention, $N_1 \cong N_2$ means the equation $|N_1 - N_2| \leq 5$ Å. Accordingly, it can be said that the components having small pore radii not exceeding 50 Å are eliminated in the alumina hydrate for the recording medium according to the present invention without shifting a pore radius distribution in a direction toward a larger pore radius. That is, the present invention enhances an ink absorptivity without lowering a color density.

The recording medium according to the present invention can be obtained by the method to form an ink-receiving layer in which a coating liquid comprising an alumina hydrate fine powder material, and a binder as needed (alumina hydrate dispersion) is applied to a substrate and dried. Characteristic values of the ink-receiving layer can be adjusted by varying manufacturing conditions such as a kind and a mixing ratio of a binder, a concentration, a viscosity and a dispersion state of a coating liquid, a coater, a coating head, a coating amount and drying conditions, in addition to the kinds of the used alumina hydrate, and the manufacturing conditions are adequately selectable dependently on desired characteristics of the ink-receiving layer.

It is preferable that the ink-receiving layer has a pore radius maximum in a pore radius distribution within a range of from 90 to 120 Å, more preferably within a range of from 90 to 110 Å. In a pore radius distribution of an ink-receiving layer which consists of a fine powder material and a binder, it is preferable that a total volume of pores which have radii not exceeding 50 Å is not more than 10.0% of a volume of all pores of the ink-receiving layer. It is preferable that a pore radius maximum of an alumina hydrate composing an ink-receiving layer is also within the range of from 90 to 120 Å, more preferably within the range of from 90 to 110 Å. When a pore radius maximum of the alumina hydrate is too large, a color density will be lowered due to reflection and the like in pores as described above when an image is formed. When a pore radius maximum of an alumina hydrate is too small, a volume of pores of an alumina hydrate which have radii not exceeding 50 Å will become large before a treatment, thereby requiring a great effort to reduce a volume of the pores having the radii not exceeding 50 Å below 6.0%. As a result, a cost for the treatment will be increased, thereby making it difficult to provide an alumina hydrate at a low manufacturing cost.

A binder which can be used in combination with an alumina hydrate for the recording medium according to the present invention is freely selectable from among water-soluble polymers. It is preferable to use, for example, polyvinyl alcohol or modified products thereof, starch or a modified products thereof, gelatin or modified products thereof, casein or modified products thereof, gum arabic, a cellulose derivative such as carboxymethyl cellulose, hydroxyethyl cellulose or hydroxypropyl methyl cellulose, a conjugated diene series copolymer latex such as SRB latex, NBR latex or a methyl methacrylate-butadiene copolymer, a vinyl series copolymer latex such as copolymer latex having a modified functional group and ethylene acetate vinyl copolymer, polyvinyl pyrrolidone, maleic anhydride or a copolymer thereof and acrylic ester copolymer. These binders can be used independently or as a mixture of a plurality of the binders.

It is possible to select a mixing ratio by weight between an alumina hydrate and a binder within a range of from 1:1 to 30:1, more preferably within a range of from 5:1 to 25:1. By using a binder of an amount within this range, it is possible to further enhance mechanical strength of an ink-receiving layer and reserve a sufficient volume of pores, thereby sufficiently preventing cracking of the ink-receiving layer and dropping of power material, and obtaining a favorable ink absorptivity.

In addition to an alumina hydrate and a binder, a dispersant, a thickening agent, a pH adjustor, a lubricant, a fluidity modifier, a surface activator, an anti-foaming agent, waterproof agent, a mold-releasing agent, a fluorescent whitening agent, an ultraviolet absorbing agent, an antioxidant, etc. can be added to a coating liquid for forming an ink-receiving layer so far as the effect of the present invention is not impaired.

Usable as a substrate for the recording medium according to the present invention is a paper such as a paper which is adequately sized, not sized or coated with a resin such as polyethylene, a sheet like material such as a thermoplastic film and a cloth, but not limited thereto in particular.

An ink-receiving layer can be formed on a substrate of the recording medium according to the present invention by coating the substrate with a dispersive solution containing a alumina hydrate using a coater and drying it. For coating the substrate with the solution, it is possible to use a blade coater, air-knife coater, roll coater, curtain coater, bar coater, gravure coater, sprayer or the like. The dispersive solution is to be applied in an amount of from 0.5 to 60 g/m$^2$, more preferably from 5 to 45 g/m$^2$, in terms of an amount of a dry solid. After the application, surface smoothness of the ink-receiving layer can be improved using a calendaring machine as occasion demands.

The recording medium according to the present invention is applicable preferably to formation of an image by the ink-jet recording method, which enables to enhance an ink absorbing speed and form clear images with a high reproductivity of printed dots, while maintaining merits such as a favorable fixing property, high coloristic performance and high glossiness of the ink-receiving layer containing an alumina hydrate, when an alumina hydrate is used as a component for preparing an ink-receiving layer. The ink-jet recording method to be applied to the image forming method according to the present invention is not restricted in particular and it is possible to use various types of ink-jet recording methods which perform recording by ejecting a recording liquid from discharging ports corresponding to recording information to recording media.

Now, the present invention will be described in detail with reference to examples which are not limitative of the present invention. In these examples, physical values were measured in the manner below:

1. Pore Radius Distribution and Pore Volume

In cases of alumina dispersions (colloidal sols), measured samples were prepared by drying the liquids at 80° C. overnight and then crushed in a mortar. In case of sheets, samples were prepared by cutting them with a punch. These samples are deaerated at 120° C. for 8 hours under vacuum of $1\times10^{-2}$ Torr and then measured with a nitrogen adsorbing-desorbing apparatus (Omnisorp, trade name, manufactured by Coulter Co.). This instrument is configured to measure pore radii.

2. Observation of Layers Containing Alumina Hydrates (1) Observation of Sections in a Direction Perpendicular to Substrates Measured samples were prepared by cutting a recording medium having an ink-receiving layer formed on a PET film to thin plates approximately 100 nm thick using an ultra-microtome (manufactured by Sorvall, Ltd.), dipping them up on a Cu mesh covered with a collodion film subjected to an electric conductivity treatment and removing excessive water contents. These samples were observed through a transmission electron microscope at an accelerating voltage of 200 kV (H-800, trade name, manufactured by Hitachi, Ltd.).

(2) Observation of Surfaces

Recording media having ink-receiving layers formed on PET films were subjected to an electric conductivity treatment to apply Pt on the order of 10 Å (Ion Beam Spatter VA10S, trade name, manufactured by Hitachi, Ltd.). Surfaces of these samples were observed at an accelerating voltage of 3 kV using a scanning electron microscope (FE-SEM; S-5000H, trade name, manufactured by Hitachi, Ltd.).

3. Ink Absorptivities

Ink absorptivities were evaluated with the Bristow tester available from Toyo Seisaku-sho K. K. (Toyo Precision Instruments, Ltd.).

4. Printing Characteristics

Optical densities of image, bleeding and beading were evaluated by conducting ink-jet recording using inks each having compositions described below, by means of an ink-jet printer equipped with four ink-jet heads for four colors of Y (yellow), M (magenta), C (cyan) and Bk (black) inks, each having 128 nozzles arranged at a ratio of 16 nozzles per mm.

5. Optical Densities of Image (OD)

Optical densities of solid print samples monochromatically printed respectively with Y, M, C and Bk inks having Ink Composition 1 specified below were evaluated with Macbeth reflection densitometer RD-918.

(Ink Composition 1)

| Dye | 5 parts by weight |
|---|---|
| Ethylene glycol | 10 parts by weight |
| Polyethylene glycol | 10 parts by weight |
| Water | 75 parts by weight |

(Dyes Used for the Ink Compositions)

Y: C.I. Direct Yellow 86

M: C.I. Acid Red 35

C: C.I. Direct Blue 199

Bk: C.I. Food Black 2

EXAMPLE 1

Aluminum octaoxide was synthesized by the method disclosed by U.S. Pat. Nos. 4,242,271 and 4,202,870, and then hydrolyzed to prepare an alumina slurry. Water was added to the alumina slurry until it had 5% by weight of solid contents of an alumina hydrate. The alumina slurry was heated to 80° C. and reacted for 10 hours for aging, and a colloidal sol thus obtained was dried with a sprayer, thereby preparing Alumina Hydrate No. 1. The Alumina Hydrate No. 1 was mixed with water for dispersion therein, adjusted to pH 4 with hydrochloric acid and then stirred for some time. Subsequently, small components were eliminated by the ultrafiltration method (using ACV-3050 Module, trade name, manufactured by Asahi Chemical Corp.), thereby obtaining a colloidal sol. The colloidal sol was desalted and deflocculated by adding acetic acid. Alumina Hydrate No. 2 was prepared by drying the colloidal sol after the deflocculation, and X-ray diffractometry of the Alumina Hydrate No. 2 indicated the pseudo-boehmite structure. Furthermore, a measurement of a pore radius distribution by the nitrogen adsorption·desorption method indicated that a volume of pores having radii not exceeding 50 Å was not more than 6.0% of a volume of all pores as shown in Table 1.

Polyvinyl alcohol PVA 117 (trade name, a product of Kurare, Ltd.) was dissolved into pure water to prepare a solution at 10% by weight. A solution at 17% by weight was obtained by condensing the colloidal sol of the Alumina Hydrate No. 2. A dispersion to be used as a coating liquid was prepared by mixing and stirring the colloidal sol solution of the Alumina Hydrate No. 2 and the polyvinyl alcohol solution so as to become a mixing ratio of 10:1 by weight of a solid content of the alumina hydrate to a solid content of the polyvinyl alcohol.

The dispersion was applied directly to a substrate of a PET film 100 μm thick (Lumirror, trade name, a product of Toray Co., Ltd.) to prepare a recording medium provided with an ink-receiving layer having a dry thickness of approximately 40 g/m$^2$.

Figure 2:
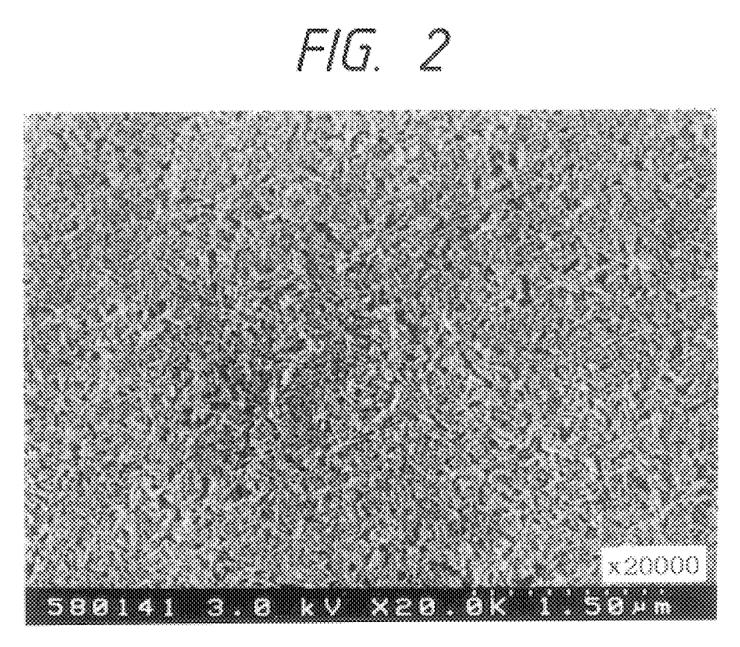
FIG. 2 is a scanning electron microphotograph of a surface of an ink-receiving layer of the recording medium according to the present invention.
Figure 3:
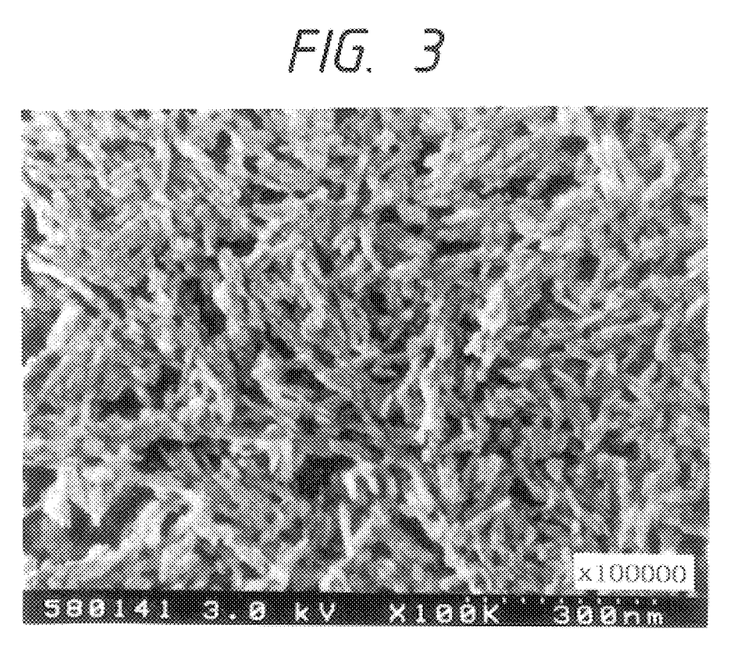
FIG. 3 is a scanning electron microphotograph of a surface of an ink-receiving layer of the recording medium according to the present invention.

Small components distributed on a surface of the ink-receiving layer could not be recognized as shown in FIG. 1 which was a transmission electron microphotograph (magnification at 200,000) of a section of the ink-receiving layer in a direction perpendicular to the substrate. A layer which hindered penetration of inks was not recognized and pores which were uniform as a whole were observed on a surface layer as shown in FIGS. 2 and 3 which were scanning electron microphotographs (FIG. 2 at a magnification of 20,000 and FIG. 3 at a magnification of 100,000). An image was recorded on the ink-receiving layer with the ink-jet printer described above and an optical density of image was measured. A measured result is listed in Table 2. Furthermore, a pore radius distribution of the ink-receiving layer was measured. The results are shown in Table 3.

EXAMPLE 2

Aluminum chloride was mixed at a concentration of 4.5% by weight and stirred in pure water. Then, pH level was adjusted to 4 by adding sodium aluminate. The solution was heated to 90° C., adjusted to pH 9 using sodium hydroxide and reacted for 35 hours for aging. Subsequently, an Alumina Hydrate No. 3 was prepared by drying a colloidal sol thus obtained with a sprayer. The Alumina Hydrate No. 3 was mixed with pure water for dispersion therein, adjusted to pH 4 with hydrochloric acid and stirred for some time. Then, a colloidal sol was prepared by eliminating small components by the ultrafiltration method as in Example 1. The colloidal sol was desalted and deflocculated by adding acetic acid. Alumina Hydrate No. 4 was prepared by drying the colloidal sol after the deflocculation, and X-ray diffractometry of the Alumina Hydrate No. 4 indicated the pseudo-boehmite structure. Furthermore, a measurement of a pore radius distribution by the nitrogen adsorption·desorption method indicated that a volume of pores having radii not exceeding 50 Å was not more than 6.0% of a volume of all pores, as shown in Table 1.

Using the Alumina Hydrate No. 4, a recording medium was manufactured in the procedure similar to that in Example 1, and a surface and a section of an ink-receiving layer of the recording medium were observed through the transmission electron microscope and the scanning electron microscope. No layer which hindered ink absorption was recognized but pores which were uniform as a whole were observed. An optical density of image and a pore radius distribution on this ink-receiving layer were also measured as in example 1. Measured results are summarized in Tables 2 and 3.

EXAMPLE 3

An Alumina Hydrate No. 1 was prepared as in Example 1. The Alumina Hydrate No. 1 was mixed with pure water for dispersion therein, adjusted to pH 4 with hydrochloric acid and stirred for some time. Then, the dispersion was heated again to 90° C., adjusted to pH 10 with sodium aluminate and stirred for 8 hours. Subsequently, a colloidal sol was prepared by cooling the dispersion to room temperature and adjusting it to pH 8 with hydrochloric acid. The colloidal sol was desalted and deflocculated by adding acetic acid. The colloidal sol was dried to obtain Alumina Hydrate No. 5, the X-ray diffractometry of which indicated the pseudo-boehmite structure. Furthermore, a measurement of a pore radius distribution by the nitrogen adsorption-desorption method indicated a volume of pores having radii not exceeding 50 Å which was not more than 6.0% of a volum of all pores as shown in Table 1. Subsequently, a recording medium was manufactured in the procedure similar to that in Example 1, and an optical density of image and a pore radius distribution were measured as in Example 1. Measured results are indicated in Tables 2 and 3.

EXAMPLE 4

An Alumina Hydrate No. 3 was prepared as in example 2. The Alumina Hydrate No. 3 was mixed with pure water for dispersion therein, adjusted to pH 4 with hydrochloric acid and stirred for some time. Then, the dispersion was heated again to 90° C., adjusted to pH 10 with sodium aluminate and stirred for four hours. Subsequently, a colloidal sol was prepared by cooling the dispersion to room temperature and adjusting it to pH 8 with hydrochloric acid. The colloidal sol was desalted and deflocculated by adding acetic acid. The colloidal sol was dried to obtain Alumina Hydrate No. 6, the X-ray diffractometry of which indicated the pseudo-boehmite structure. Furthermore, a measurement of a pore radius distribution by the nitrogen adsorption-desorption method indicated that a volume of pores having radii not exceeding 50 Å was not more than 6.0% of a volume of all pores as shown in Table 1. Subsequently, a recording medium was manufactured in the procedure similar to that in Example 1, and an optical density of image and a pore radius distribution of an ink-receiving layer were measured. Measured results are listed in Tables 2 and 3.

EXAMPLE 5

An alumina hydrate to be used as a starting material was prepared in the same procedure as that for the Alumina Hydrate No. 1 in Example 1, except for an aging reaction time which was set at 15 hours. The Alumina Hydrate was subjected to a secondary treatment as in example 1 and a pore radius distribution was measured by the nitrogen adsorption-desorption method. Measured result is listed in Table 1.

Using this alumina hydrate, a recording medium was manufactured in the procedures similar to those in Example 1, and an optical density of image and a pore radius distribution were measured as in Example 1. Measured results are summarized in Tables 2 and 3.

EXAMPLE 6

An alumina hydrate to be used as a starting material was prepared in the same procedure as that for the Alumina Hydrate No. 3 in Example 2, except for an aging reaction time which was set at 45 hours. The alumina hydrate was subjected to a secondary treatment as in Example 3 and a pore radius distribution was measured by the nitrogen adsorption-desorption method. A result thus obtained is listed in Table 1.

Using the alumina hydrate, a recording medium was manufactured in the procedure similar to that in Example 1, and an optical density of image and a pore radius distribution of an ink-receiving layer were measured as in Example 1. Measured results are listed in Tables 2 and 3.

Comparative Example 1

Alumina Hydrate No. 1 synthesized in Example 1, without subjected to a treatment by the ultrafiltration method, was mixed with pure water for dispersion therein, desalted and deflocculated. An Alumina Hydrate No. 7 was prepared by drying the dispersion. X-ray diffractometry of the Alumina Hydrate No. 7 indicated the pseudo-boehmite structure. Furthermore, measurement of a pore radius distribution by the nitrogen adsorption-desorption method indicated that a volume of pores having radii not exceeding 50 Å exceeded 6.0% of a volume of all pores (shown in Table 1). Using the Alumina Hydrate No. 7, a recording medium was manufactured by forming an ink-receiving layer in the procedure similar to that in Example 1. Observation of a section of the ink-receiving layer through the transmission electron microscope allowed to recognize layers on the ink-receiving layer which are assumed to be composed of small components. Furthermore, the scanning electron microscope permitted observing that layers which hindered ink penetration were formed on a surface and pores which were distributed unevenly as a whole. An optical density of image of the ink-receiving layer was measured as in Example 1. Measured results are summarized in Table 2.

Comparative Example 2

Aluminum chloride was mixed with pure water in a concentration of 4.5% by weight and stirred. Then, pH was adjusted to 4 by adding sodium aluminate. This solution was heated to 90° C., adjusted to pH 9 with sodium hydroxide and reacted for 35 hours for aging. Thereafter, an alumina hydrate was prepared by drying a colloidal sol thus obtained with a sprayer. Without treating the alumina hydrate by the ultrafiltration method, it was mixed with pure water for dispersion therein, desalted and deflocculated. Alumina Hydrate No. 8 was prepared by drying the dispersion. X-ray diffractometry of the Alumina Hydrate No. 8 indicated that the alumina hydrate was the pseudo-boehmite structure. A measurement of a pore radius distribution by the nitrogen adsorption-desorption method indicated that a volume of pores having radii not exceeding 50 Å exceeded 6.0% of a volume of all pores (Table 1).

Using the Alumina Hydrate No. 8, a recording medium was manufactured by forming an ink-receiving layer in the procedure similar to that in Example 1. When a section of this ink-receiving layer was observed through the transmission electron microscope, it was recognized that layers which were assumed to be composed of small components were formed on a surface of the ink-receiving layer. Furthermore, observation through the scanning electron microscope allows to confirm that layers which hindered ink penetration were formed on the surface and pores were distributed unevenly as a whole. An optical density of image of the ink-receiving layer was measured as in Example 1. Measured results are listed in Table 2.

Comparative Example 3

The alumina hydrate obtained before the secondary treatment in Example 5 was mixed with pure water for dispersion therein, desalted and deflocculated. A pore radius distribution of an alumina hydrate thus obtained was measured by the nitrogen adsorption-desorption method, thereby obtaining a result shown in Table 1.

Using the alumina hydrate, a recording medium was manufactured in the procedure similar to that in Example 1, and an optical density of image of an ink-receiving layer was measured as in Example 1. Measured results are listed in Table 2.

Comparative Example 4

The alumina hydrate obtained before the secondary treatment in Example 6 was mixed with pure water for dispersion therein, desalted and deflocculated. A pore radius distribution of an alumina hydrate thus obtained was measured by the nitrogen adsorption·desorption method, thereby obtaining a result shown in Table 1.

Using the alumina hydrate, a recording medium was manufactured in the procedure similar to that in Example 1, and an optical density of image of an ink-receiving layer was measured as in Example 1. Measured results are listed in Table 2.

TABLE 1

| | Pore volume (cc/g) | Volume of pores having radii not exceeding 50 Å (cc/g) | Pore radius maximum (Å) |
|---|---|---|---|
| Example 1 | 0.80 | 0.0320 | 100 |
| Example 2 | 0.81 | 0.0326 | 93 |
| Example 3 | 0.85 | 0.0214 | 102 |
| Example 4 | 0.81 | 0.0475 | 98 |
| Example 5 | 0.81 | 0.0299 | 99 |
| Example 6 | 0.72 | 0.0335 | 94 |
| Comparative Example 1 | 0.76 | 0.1012 | 107 |
| Comparative Example 2 | 0.81 | 0.1065 | 101 |
| Comparative Example 3 | 0.75 | 0.0962 | 112 |
| Comparative Example 4 | 0.70 | 0.0972 | 103 |

TABLE 2

| | OD | | | |
|---|---|---|---|---|
| | Bk | Y | C | M |
| Example 1 | 1.78 | 1.78 | 2.07 | 2.00 |
| Example 2 | 1.82 | 1.72 | 1.96 | 1.92 |
| Example 3 | 1.80 | 1.78 | 2.05 | 2.01 |
| Example 4 | 1.78 | 1.76 | 1.96 | 1.98 |
| Example 5 | 1.93 | 1.80 | 2.09 | 1.88 |
| Example 6 | 1.94 | 1.81 | 2.05 | 1.89 |
| Comparative Example 1 | 1.72 | 1.68 | 1.90 | 1.88 |
| Comparative Example 2 | 1.70 | 1.60 | 1.72 | 1.75 |
| Comparative Example 3 | 1.85 | 1.71 | 1.92 | 1.80 |
| Comparative Example 4 | 1.82 | 1.70 | 1.93 | 1.78 |

TABLE 3

| | Pore volume (cc/g) | Volume of pores having radii not exceeding 50 Å (cc/g) | Pore radius maximum (Å) |
|---|---|---|---|
| Example 1 | 0.30 | 0.0219 | 97 |
| Example 2 | 0.33 | 0.0191 | 91 |
| Example 3 | 0.38 | 0.0206 | 98 |
| Example 4 | 0.31 | 0.0183 | 94 |
| Example 5 | 0.35 | 0.0172 | 90 |
| Example 6 | 0.31 | 0.0229 | 91 |

Figure 7:
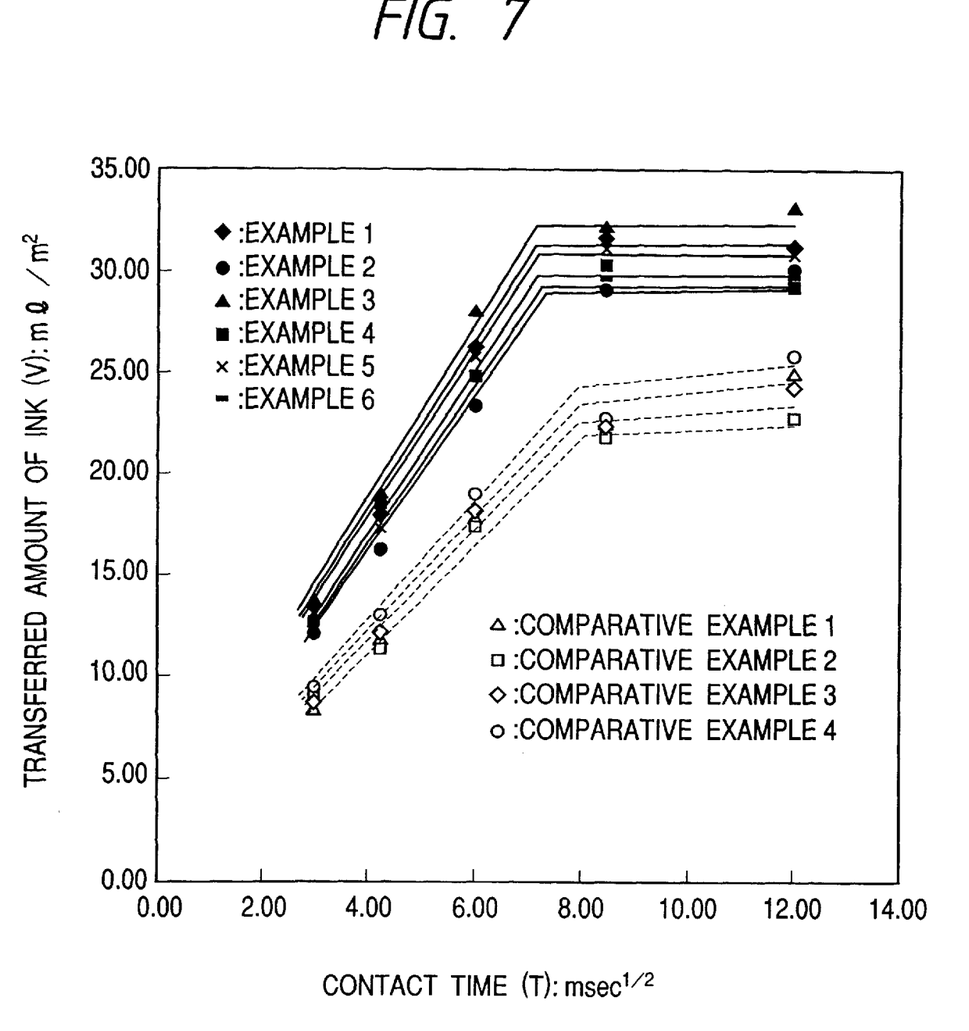
FIG. 7 is a diagram illustrating ink absorbing speeds of recording media measured by means of a Bristow tester.

FIG. 7 shows results obtained by measuring transferred amount of inks by means of a Bristow tester with respect to Examples 1 through 6 and Comparative Examples 1 through 4. It will be understood from FIG. 7 that an ink-receiving layer exhibits a high ink absorbing speed when a volume of pores having radii not exceeding 50 Å is not more than 6.0% of a volume of all pores.

As understood from the foregoing description, the present invention is capable of providing a novel recording medium which has a high ink absorbing speed and is capable of forming printed dots with a high reproducibility.

Furthermore, the image forming method according to the present invention makes it possible to obtain prints, high in an optical density of image, glossiness and having a high quality which is the same level as in silver salt type photographs.

What is claimed is:

1. A recording medium, comprising an alumina hydrate in an ink-receiving layer provided on a substrate, said alumina hydrate having a pore radius maximum $N_2$ in its pore radius distribution and being obtained by subjecting to a secondary treatment a raw alumina hydrate having a pore radius maximum $N_1$ in its pore radius distribution, wherein $N_2$ is less than $N_1$, $N_2$ is within a range of from 90 to 120 Å, and after the secondary treatment the total volume of all pores having radii not exceeding 50 Å in the pore radius distribution of the alumina hydrate in the ink-receiving layer is not more than 6.0% of the total volume of all pores in the pore radius distribution of the alumina hydrate in the ink-receiving layer.

2. The recording medium according to claim 1, wherein $N_2$ is within a range of from 90 to 110 Å.

3. A recording medium having an ink-receiving layer which consists essentially of an alumina hydrate and a binder, and formed on a base material, wherein said alumina hydrate has a pore radius maximum $N_2$ within a range of from 90 to 110 Å and the total volume of all pores having radii not exceeding 50 Å in the pore radius distribution of said ink-receiving layer is not more than 10.0% of the total volume of all pores in the pore radius distribution of said ink-receiving layer.

4. A recording medium having an ink-receiving layer which is comprised of an alumina hydrate and a binder, and formed on a base material, wherein said alumina hydrate has a pore radius maximum within a range of from 90 to 110 Å; and the total volume of all pores having radii not exceeding 50 Å in the pore radius distribution of said alumina hydrate is not more than 6.0% of the total volume of all pores in the pore radius distribution of said alumina hydrate, wherein the total volume of pores having radii not exceeding 50 Å in the pore radius distribution of said ink-receiving layer is not more than 10.0% of the total volume of all pores in the pore radius distribution of said ink-receiving layer.

* * * * *

UNITED STATES PATENT AND TRADEMARK OFFICE
CERTIFICATE OF CORRECTION

PATENT NO. : 6,649,234 B1
DATED : November 18, 2003
INVENTOR(S) : Masanobu Asaoka et al.

It is certified that error appears in the above-identified patent and that said Letters Patent is hereby corrected as shown below:

Title page, Item [54] and Column 1, Line 2,
Title, "IN-RECEIVING" should read -- INK-RECEIVING --.

Signed and Sealed this

Twenty-first Day of June, 2005

JON W. DUDAS
*Director of the United States Patent and Trademark Office*